(12) United States Patent
Ito et al.

(10) Patent No.: US 6,478,566 B2
(45) Date of Patent: Nov. 12, 2002

(54) SLIDE GUIDE DEVICE, KNOCKOUT DEVICE, AND PRESS MACHINE USING THE SAME

(75) Inventors: Takao Ito; Hisanobu Kanamaru, both of Sagamihara (JP)

(73) Assignee: Aida Engineering Co., Ltd., Kanagawa (JP)

( * ) Notice: Subject to any disclaimer, the term of this patent is extended or adjusted under 35 U.S.C. 154(b) by 0 days.

(21) Appl. No.: 10/076,160

(22) Filed: Feb. 14, 2002

(65) Prior Publication Data

US 2002/0071884 A1 Jun. 13, 2002

Related U.S. Application Data

(62) Division of application No. 09/544,848, filed on Apr. 6, 2000.

(30) Foreign Application Priority Data

Apr. 6, 1999 (JP) ............................................ 11-098319
Apr. 8, 1999 (JP) ............................................ 11-100799

(51) Int. Cl.[7] .............................................. B29C 39/36
(52) U.S. Cl. ........................ 425/154; 425/422; 425/444
(58) Field of Search ................................ 425/193, 195, 425/394, 406, 412, 398, 399, 444, 422, 154; 72/452.2, 427; 100/218; 249/68

(56) References Cited

U.S. PATENT DOCUMENTS

| | | | | |
|---|---|---|---|---|
| 2,482,338 A | * | 9/1949 | Hall ............................ | 425/143 |
| 3,095,247 A | * | 6/1963 | Zelewsky ..................... | 384/40 |
| 3,752,622 A | * | 8/1973 | Viadana ....................... | 425/78 |
| 4,096,728 A | * | 6/1978 | Glecker et al. ............... | 72/345 |
| 4,127,062 A | * | 11/1978 | Egosi .......................... | 100/215 |
| 4,552,525 A | * | 11/1985 | Stehr .......................... | 425/422 |
| 4,978,233 A | * | 12/1990 | Stotzel et al. ................ | 384/12 |
| 5,013,163 A | * | 5/1991 | Gosdowski et al. .......... | 384/38 |
| 5,735,610 A | * | 4/1998 | Mark et al. .................. | 384/42 |

* cited by examiner

*Primary Examiner*—Jan H. Silbaugh
*Assistant Examiner*—Emmanuel S. Luk
(74) *Attorney, Agent, or Firm*—Darby & Darby

(57) ABSTRACT

A middle liner of a slide guide device for a machine press has a spherical shaped side which fits into a sliding gib attached to a slide. The middle liner slides along a fixed gib at first and second linear surfaces that are at an angle with each other. The combination of self-alignment and smooth movement of the slide is achieved in the presence of an eccentric load acting on the slide. A machine press equipped with such a slide guide device has excellent eccentric load resistance and high working precision. In a further embodiment, a press machine is further equipped with a knockout device having knockout block moving between a pair of guide rails. A plurality of middle liners, each having at least one spherical surface, are positioned between the knockout block and the guide rails. The resulting knockout device provides a stable knockout load with low noise and low energy consumption.

6 Claims, 7 Drawing Sheets

SLIDE GUIDE DEVICE, KNOCKOUT DEVICE, AND PRESS MACHINE USING THE SAME

This application is a division of pending application Ser. No. 09/544,848, filed on Apr. 6, 2000.

BACKGROUND OF THE INVENTION

The present invention relates to a slide guide device having a self-aligning mechanism which, even if an eccentric load acts on the slide, the slide operates smoothly. The present invention further relates to a knockout device for removing a press worked product from within a die. The present invention also relates to a press machine which is equipped with a slide guide device and a knockout device for removing the pressed worked product. Such a press machine is especially suitable for high precision molding of parts, particularly cold extrusion parts, punched parts, drawn parts, and the like.

Innovations to make the sliding of the slide and guide post smooth, to ensure the product precision of the press products, or to absorb unbalanced loads on a slide and heighten the dynamic precision, are constantly being conducted for press machines and the like. Currently, however, a satisfactory mechanism has yet to be achieved.

In Japanese Laid-Open Patent Publication Number 8-206895, a slide guide device for a press machine has a plurality of guide posts provided at appointed locations of a slide. The plurality of guide posts supports a vertically oriented base shaft part in a freely rotating manner. An eccentric shaft part, which is unbalanced by a constant eccentricity amount with respect to this base shaft part, extends downward from the plurality of guide posts. A plurality of guide blocks are separately attached opposite each of the guide posts. The plurality of guide blocks guides the eccentric part in the vertical direction in a freely sliding manner. The guide blocks are disposed so that the direction of eccentricity of the eccentric shaft part with respect to the base shaft part of each of the guide posts has an angle relationship with respect to the thermal expansion direction of the slide so that, while the center of the slide is maintained at a constant position, the slide is guided in the vertical direction in a freely moving state. A slide is guided in a freely moving state in the vertical direction by the plurality of guide posts.

In Japanese Laid-Open Patent Number 8-174294, a slide gib is multiply divided in the shaft line direction from the center of a long material having a cylindrical central hole. In addition, the inner perimeter surface of the central hole is made to be a sliding surface. The liner is multiply divided in the shaft line direction from the center of a cylinder. The outer perimeter surface of the cylinder is made to be a sliding surface. The dynamic precision is improved by minimizing the mis-alignment of each of the upright and the slide.

However, with the former slide guide device, the displacement of the slide is absorbed by making the center of the base shaft part of the guide post capable of moving horizontally with respect to the center of the eccentric shaft part in the direction of displacement resulting from thermal expansion. When an eccentric load acts on the slide, the bending stress on the eccentric shaft parts at the four corners is unavoidable. Because of the action of a twisting torque, a smooth vertical motion of the slide can not be anticipated, and, therefore, it is difficult to bring out the precision of the die.

The latter example is constructed so that the slide gib and the liner make contact in the radial direction at the arc surface. However, because it is a member which is long in the shaft direction, and there is a line contact or a surface contact in the shaft direction, even if the eccentric load in the rotation direction is absorbed, absorbing the eccentric load in the shaft direction remains difficult.

A knockout device for a press machine is a necessary mechanism for removing a product which has been worked in a press. Knockout devices are widely used irrespective of the type of press.

A conventional construction for a knockout device is described in Japanese Laid Open Patent Publication Number 6-126368. In this embodiment, a lower holder, anchoring a die, is affixed o a top surface of a bolster. A through hole is formed in the center of the lower holder and bolster. A mandrel transfer pin is inserted through this hole. The knockout pin moves vertically due to a roller which abuts against the lower end of this pin. Furthermore, this roller is linked with a cam mechanism through a third link mechanism.

In Japanese Laid Open Patent Publication Number 9-285830, a knockout device is disclosed which has a knockout pin guided by a case and a taper block.

However, with the former construction, the roller pivots along the path drawn by the end of a pivoting link member having one end as the support point. Therefore, the contact point with the knockout pin moves with the position of the roller. In addition, the knockout pin also moves, and, as a result, it is difficult to always push up perpendicularly. Problems arise in which this becomes mechanical vibration or becomes a sliding load and requires a large amount of energy for the motion.

With the latter, the roller still moves along the movement pathway of the knockout lever as in the former example. The roller does not have a construction wherein the center of the knockout pin is always being pushed up at the time of knockout. Therefore, as a matter of course, a bending stress acts on the knockout pin, and a smooth motion with the case is not achieved. The same problems as described above are also a concern.

OBJECTS AND SUMMARY OF THE INVENTION

It is an object of the present invention to provide a slide guide device wherein, even if an eccentric load acts on a slide, self-alignment is possible and movement is conducted smoothly.

It is a further object of the present invention to provide a knockout device for a low noise, energy conserving press machine wherein knockout requires a small amount of energy and operation is conducted under an always stable knockout load.

It is still a further object of the present invention to provide a simple construction for a press machine with excellent eccentric load resistant properties and with a high working precision.

Briefly stated, there is provided a middle liner of a slide guide device for a machine press having a spherical shaped side which fits into a sliding gib attached to a slide. The middle liner slides along a fixed gib first and second linear surfaces at an angle with each other. Self-alignment and smooth movement of the slide is achieved even when an eccentric load acts on the slide. A machine press equipped with such a slide guide device has excellent eccentric load resistance and high working precision. A press machine is further equipped with a knockout device having knockout block moving between a pair of guide rails. A plurality of middle liners, having at least one spherical surface, are positioned between the knockout block and the guide rails. The resulting knockout device provides a stable knockout load with low noise and low energy consumption.

According to an embodiment of the present invention, there is provided a slide guide device comprising: a sliding member; at least first and second fixed gibs disposed on opposite sides of the sliding member; at least first and second sliding gibs attached to the sliding member; a middle liner on the at least first and second sliding gibs, slidably contacting the at least first and second fixed gibs; and the middle liner having a spherical contact on a first side with one of the fixed gibs and the sliding gibs, and a planar contact on a second, opposite side with the other of the fixed gibs and the sliding gibs.

According to another embodiment of the present invention, there is provided a knockout device for a press machine having a slider with a die attachment surface, comprising: a lower holder opposite the die attachment surface; a knockout pin passing through the lower holder; a knockout block which knocks out the knockout pin; at least first and second guide rails disposed at opposite sides of the knockout block; means for moving the knockout block along the at least first and second guide rails; and a plurality of middle liners, having at least one spherical surface, between a side surface of the knockout block and the at least first and second guide rails.

According to a feature of the present invention, there is provided a press machine, comprising: a sliding member; at least first and second fixed gibs disposed on opposite sides of the sliding member; at least first and second sliding gibs attached to the sliding member; a middle liner on the at least first and second sliding gibs, slidably contacting the at least first and second fixed gibs; and the middle liner having a spherical contact on a first side with one of the fixed gibs and the sliding gibs, and a planar contact on a second, opposite side with the other of the fixed gibs and the sliding gibs.

One embodiment of the present inventions is drawn to a slide guide device, wherein a middle liner, in which one side has spherical contact and the other side has a plane contact, is disposed between a fixed gib and a slide gib.

Preferably, the present invention is drawn to a slide guide device, wherein the plane contact surface of the middle liner comprises two orthogonal surfaces and contacts with the fixed gib.

More preferably, the present invention is a slide guide device, wherein the middle liner forms, in a shell-shape, two plane contact surfaces which intersect orthogonally on the interior.

Even more preferably, the present invention is a slide guide device, wherein a recessed part is formed on a ridge line on the orthogonal surfaces of the middle liner.

Even more preferably, the present invention is a slide-guide device, wherein the construction positions the rotation center of the middle liner at the center of the slide surface.

Another embodiment of the present inventions is drawn to a press machine. The press machine has a fixed gib, which is disposed in a fixed manner at four corners of the perimeter, and a middle liner, which is disposed between the fixed gib and slide gib, contributing to the movement of the slide. The middle liner is in spherical contact with the slide gib on one side, and the other side is in contact with the fixed gib by two orthogonal planes.

Preferably, the present invention is drawn to a press machine, wherein the slide is constructed from an upper slide, which moves vertically in response to the screw action of a rotation screw shaft, and a lower slide, which is joined to the upper slide and fits with the screw shaft so that there is play therebetween. A middle liner is disposed at the top and bottom four corners of each of the slides.

More preferably, the present invention is drawn to a press machine, wherein a nut joins to the upper slide which screws onto the screw shaft. The nut contacts the lower slide with a spherical surface. The upper and lower slides are joined by a screw.

One embodiment of the present invention is achieved by a knockout device for a press machine. The knockout device has a lower holder disposed opposite a die attachment surface of a vertically moving slide. A knockout pin passes through the lower holder. A knockout block, for knocking out the knockout pin is provided in the knockout device. A plurality of middle liners, having at least one surface as a spherical surface, is disposed between a side surface of the knockout block and a pair of guide rails, which is disposed and affixed opposite the block side surface. The middle liners guide the knockout block.

Preferably, the present invention is achieved by a knockout device, wherein the guide rail is tubular or cylindrical and is in surface contact with the other surface of the middle liner.

More preferably, the present invention is achieved by a knockout device, wherein the guide rail is a triangle pole and is in two surface contact with the other surface of the middle liner.

Even more preferably, the present invention is achieved by a knockout device, wherein the lower end of the knockout block is pivotably connected via an eccentric pivoting mechanism to one end of a knockout lever whose other end is connected to a motion source which moves vertically.

One embodiment of the present invention is achieved by a knockout device for a press machine. The knockout device has a lower holder disposed opposite a die attachment surface of a slide which moves vertically. A knockout pin passes through this lower holder. A knockout block knocks out the knockout pin. A plurality of middle liners are disposed between a side surface of the knockout block and a pair of guide rails which are disposed and affixed opposite this block side surface. The lower end of the knockout block connects in a pivotable manner via an eccentric pivoting mechanism to one end of a knockout lever whose other end is connected to a motion source which moves vertically. The motion source is a double acting double rod hydraulic cylinder. This cylinder, by a variable hydraulic pump which is driven by a motor, compresses and controls oil, which is supplied from a hydraulic tank. Rotational energy is stored between the hydraulic pump and the motor. A fly wheel is provided via a clutch which is opened and closed by an external control.

Preferably, the present invention is achieved by a knockout device, wherein, after the rotational energy of the motor is stored in the fly wheel, the rotational energy is supplied to the hydraulic pump via the clutch which opens and closes by an external control.

More preferably, the present invention is achieved by a knockout device, wherein, when the oil pressure inside the hydraulic supply circuit exceeds a preset standard value, a pressure control valve operates and oil is guided to the tank.

The above, and other objects, features and advantages of the present invention will become apparent from the following description read in conjunction with the accompanying drawings, in which like reference numerals designate the same elements.

DETAILED DESCRIPTION OF THE INVENTION

Referring to FIGS. 1 through 4, an embodiment of the present invention is described according to the screw type mechanical press as depicted in the figures. A press machine body 1 has a pump motor 4 fixed on an upper crown part 3 of a frame 2. A male screw shaft 6 is joined and fixed to a power shaft 5 of pump motor 4 through a joining member. Screw shaft 6 extends to approximately the middle of press machine body 1. A spherical nut 7, whose lower end is a hemisphere, is screwed onto screw shaft 6. Spherical nut 7 is joined and fixed to an upper slide 8 via a key or the like.

Figure 1:
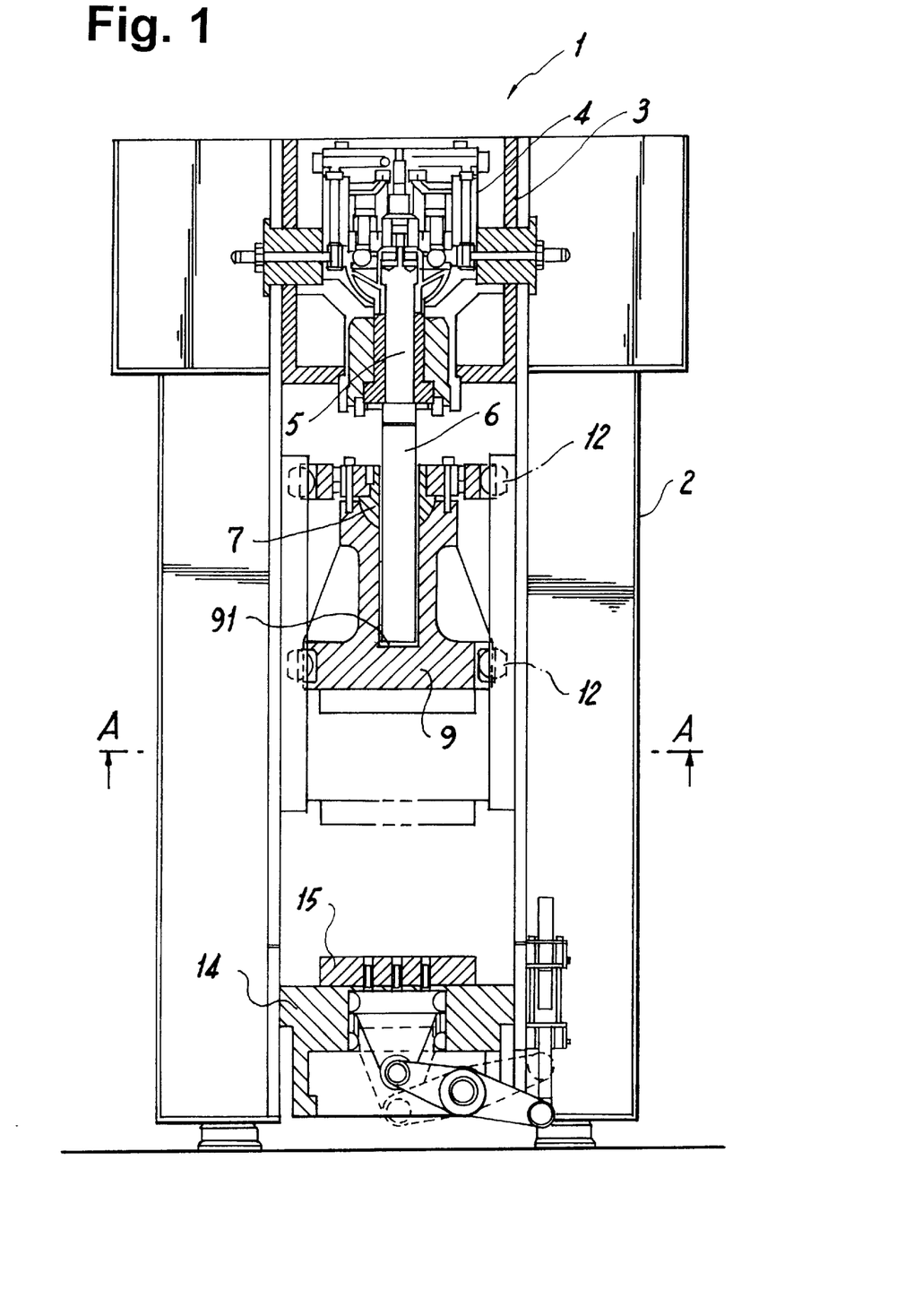
FIG. 1 is a longitudinal front view of a screw type press machine according to an embodiment of the present invention.
Figure 2:
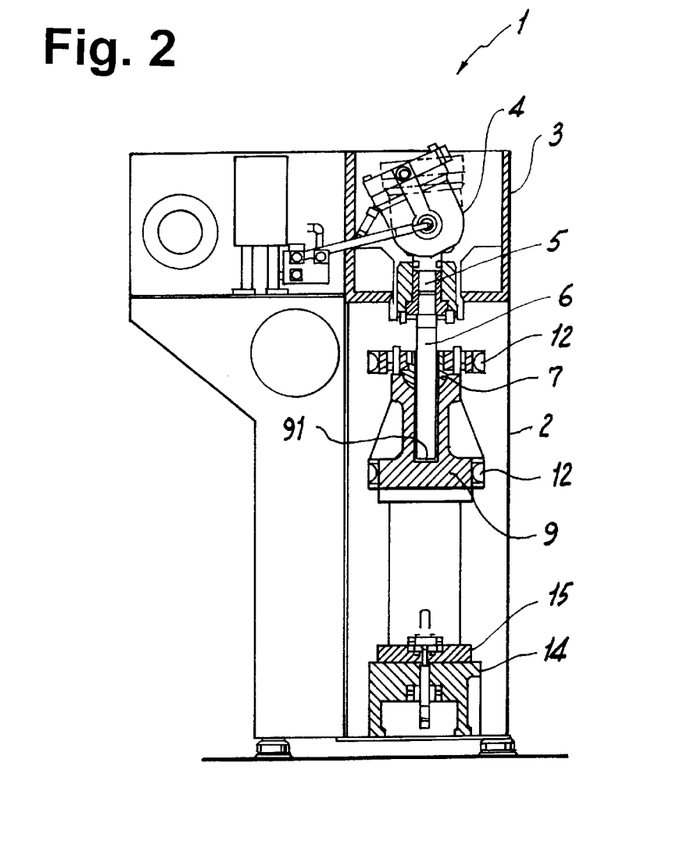
FIG. 2 is a longitudinal side view of the screw type press machine of FIG. 1.
Figure 3:
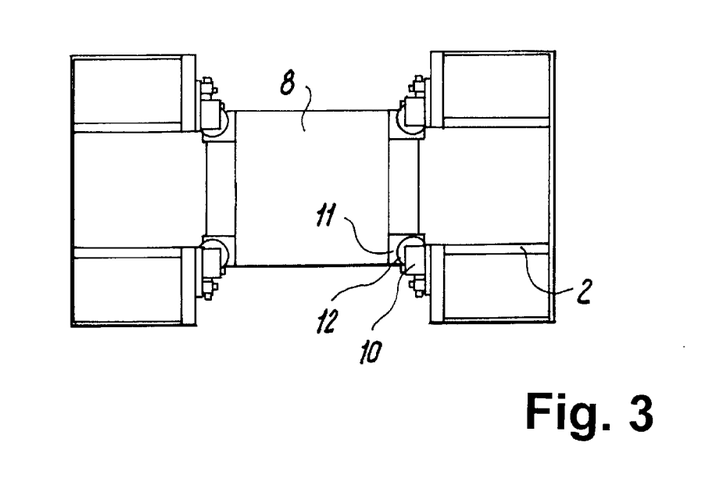
FIG. 3 is a cross-section along line A—A of FIG. 1.

At the center part of a lower slide 9, there is a hole 91, which receives screw shaft 6 with play. An upper end of lower slide 9 is in spherical contact with nut 7. Lower slide 9 is hung and fixed to upper slide 8 by a bolt.

Next, a concrete example will be described regarding the slide guide device according to a preferred embodiment of the present invention.

Figure 4:
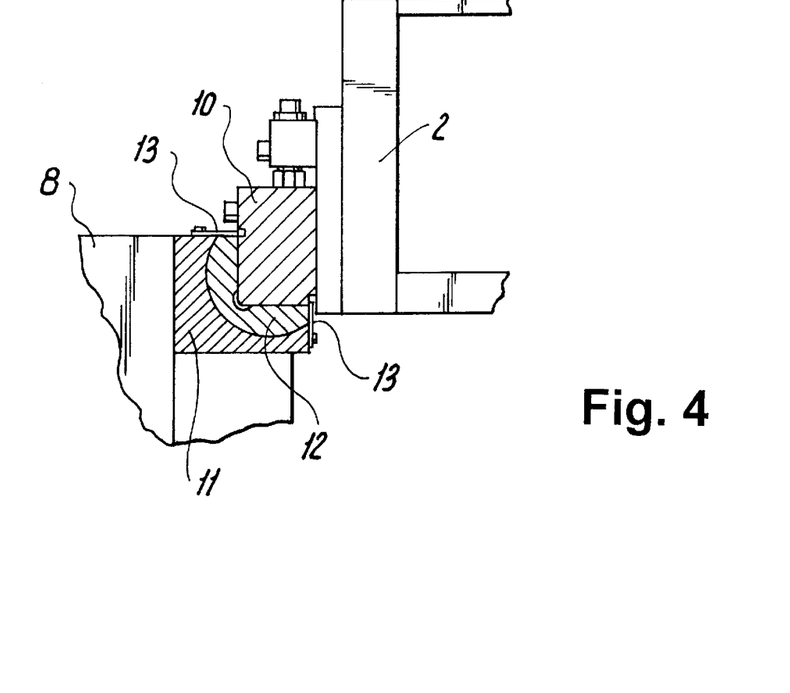
FIG. 4 is an enlarged cross-section of a slide guide of the screw type press machine of FIG. 1.

Referring to FIG. 4, the slide guide device is constructed from four fixed gibs 10, which act as rails, fixed on the inside of frame 2. Eight slide gibs 11 are fixed to each of the four corners of slide 8(9). Middle liners 12 are positioned between slide gibs 11 and fixed gibs 10.

Figure 5:
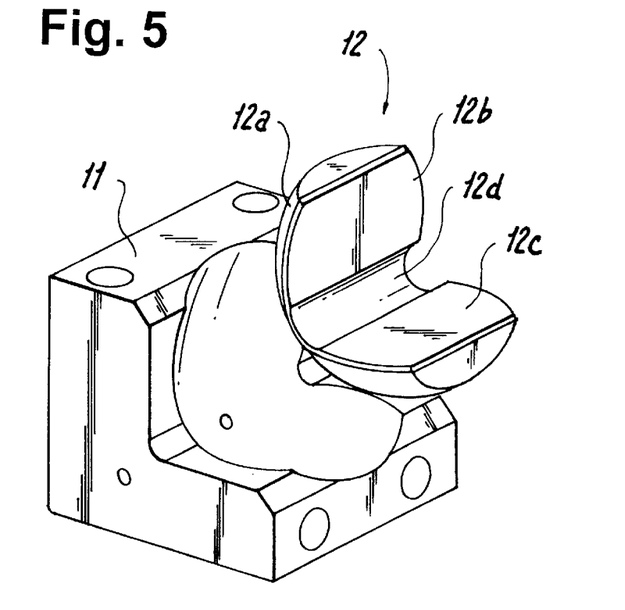
FIG. 5 is a perspective view of the slide guide of FIG. 4.

Referring to FIG. 5, the details of middle liner 12 are shown. An outer perimeter of middle liner 12 is preferably a spherical surface 12a. The opposing surface, which is on the interior, forms orthogonal planar contact surfaces 12b and 12c. A recessed part 12d for fixed gib 10 is formed on the ridge line of the orthogonal surfaces.

Middle liner 12 is inserted as shown in FIG. 4 in spherical contact with slide gib 11. Lubrication oil is supplied and middle liner 12 maintains a bearing function. Middle liner 12 is shaped so that its rotation center is always at the center of plane contact surfaces 12b and 12c. The maximum displacement in the radial direction is restricted by a stopper 13, which is fixed by a screw to slide gib 11. Furthermore, on the lower part of frame 2, a bolster 15 is disposed via a bed 14, but the details are omitted.

With this construction, torque is obtained by pump motor 4. When screw shaft 6 rotates in the direction opposite to the propulsion direction, nut 7, which screws on to screw shaft 6, and upper slide 8, which is restricted in rotation by fixed gib 10 and slide gib 11 as well as middle liner 12, descend due to screw action. Lower slide 9, which is joined to the upper slide, descends in a unitary manner as well. On the four corners of slide 8(9), middle liners 12 are in two-surface contact with fixed gib 10 and are in spherical contact with slide gib 11. In addition the center of rotation of middle liner 12 is at the center of the planar contact surfaces. As a result, even if there is an eccentric load on the slide, due to the self-aligning action of the middle liner, the stress is absorbed, and a smooth descending motion results.

In addition, lower slide 9, which has the die, and upper slide 8 are separated. The screw torque force generated on upper slide 8 is not directly transferred to the lower slide, and the torque is greatly suppressed at the time of product working.

Figure 6:
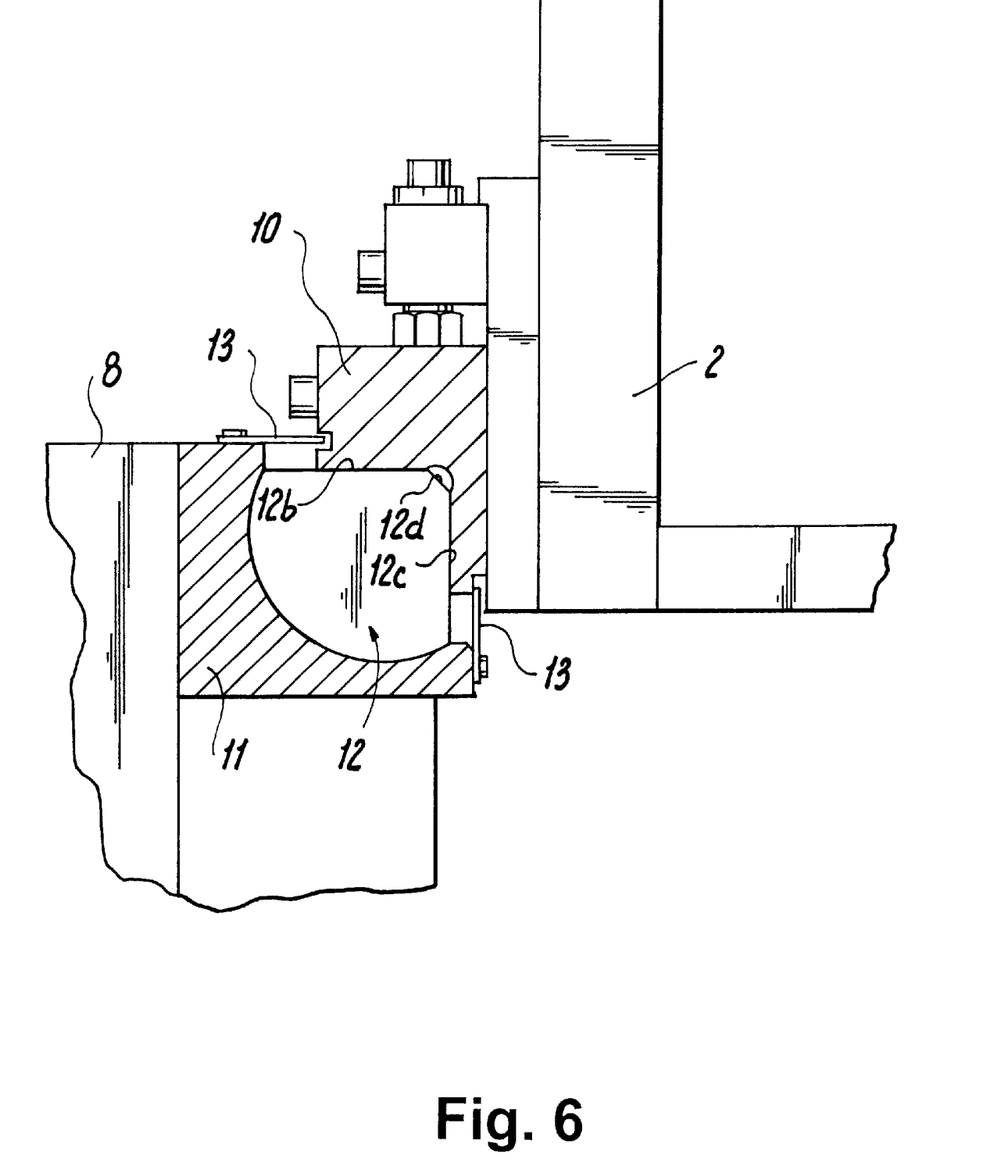
FIG. 6 is an enlarged cross-section of a slide guide according to another embodiment of the present invention.

Referring to FIG. 6, another embodiment of the present invention is shown. Planar contact surfaces 12b and 12c are formed orthogonally on the exterior of middle liner 12. Fixed gib 10 has a perpendicular depression surface opposite planar contact surfaces 12b and 12c. The essentials of the present invention are unchanged.

Furthermore, with the above embodiment, a screw type press machine was described, however, the invention is not limited to such a screw type press machine. The middle liner is effective in all slide guide devices having an eccentric load at the time of load transfer.

According to a preferred embodiment of the present invention, by disposing a middle liner, in which one side has a spherical contact and the other side has a plane contact, between a fixed gib and a slide gib, a slide guide device is self-aligning and effective for eccentric loads.

A stable and a strong construction is achieved by having the plane contact surface of the middle layer be two orthogonal surfaces and by having them contact the fixed gib.

A slide guide device with a construction that is stable and strong is obtained by having the middle liner a small size by forming, in a shell shape, two plane contact surfaces which orthogonally intersect in the interior.

A slide guide device in which smooth movement is possible by having a recessed part formed along the ridge line of the orthogonal planes of the middle liner. Furthermore, such a slide guide device does not suffer from mechanical scuffing.

A self-aligning mechanism which is always stable is obtained by having a construction in which the rotation center of the middle liner is positioned in the middle of the slide plane.

The present invention is constructed from a fixed gib, which is disposed in a fixed manner at four corners on the perimeter, and a middle liner, which is disposed between the fixed gib and the slide gib and which contributes to the motion of the slide. One side of the middle layer is in spherical contact with the slide gib. The other side contacts the fixed gib by two surfaces which are orthogonal. As a result, a highly reliable press machine is provided in which an eccentric load on the slide does not influence the product precision.

The slide is constructed from an upper slide, which moves vertically in response to the screw action of a rotation screw shaft, and a lower slide, which is joined to the upper slide and fits with the screw shaft in a manner that allows for play therebetween. In addition, by placing a middle liner on the top and bottom four corners of each of the slides, the influence on the lower slide, which is provided with a die, from an eccentric load is minimized, resulting in a press machine having a high working precision.

A nut, which is joined to the upper slide and screws onto the screw shaft, is provided, and this nut contacts the lower slide with a spherical surface. The upper and lower slides are joined by a screw. As a result, a press machine is provided in which an eccentric load is not directly transferred to a lower slide.

According to the present invention, a slide guide device is provided in which, even if an eccentric load acts on the slide, self-alignment is possible and a smooth motion is conducted. In addition, a press machine is provided having a simple construction, an excellent eccentric load resistant property, and a high working precision.

Referring to FIGS. 7 through 10, an embodiment of the present invention is described according to a screw type mechanical press as depicted.

Referring to FIGS. 7 through 10, press machine body 1 has pump motor 4 affixed to upper crown part 3 of frame 2. Male screw shaft 6 is joined and affixed to power shaft 5 of pump motor 4 through a joining member comprising a flange 61. Screw shaft 6 extends to approximately the middle of the press machine body. Spherical nut 7, whose lower end is a hemisphere, screws onto screw shaft 6. Spherical nut 7 is joined and affixed to upper slide 8 through a key or the like.

Figure 7:
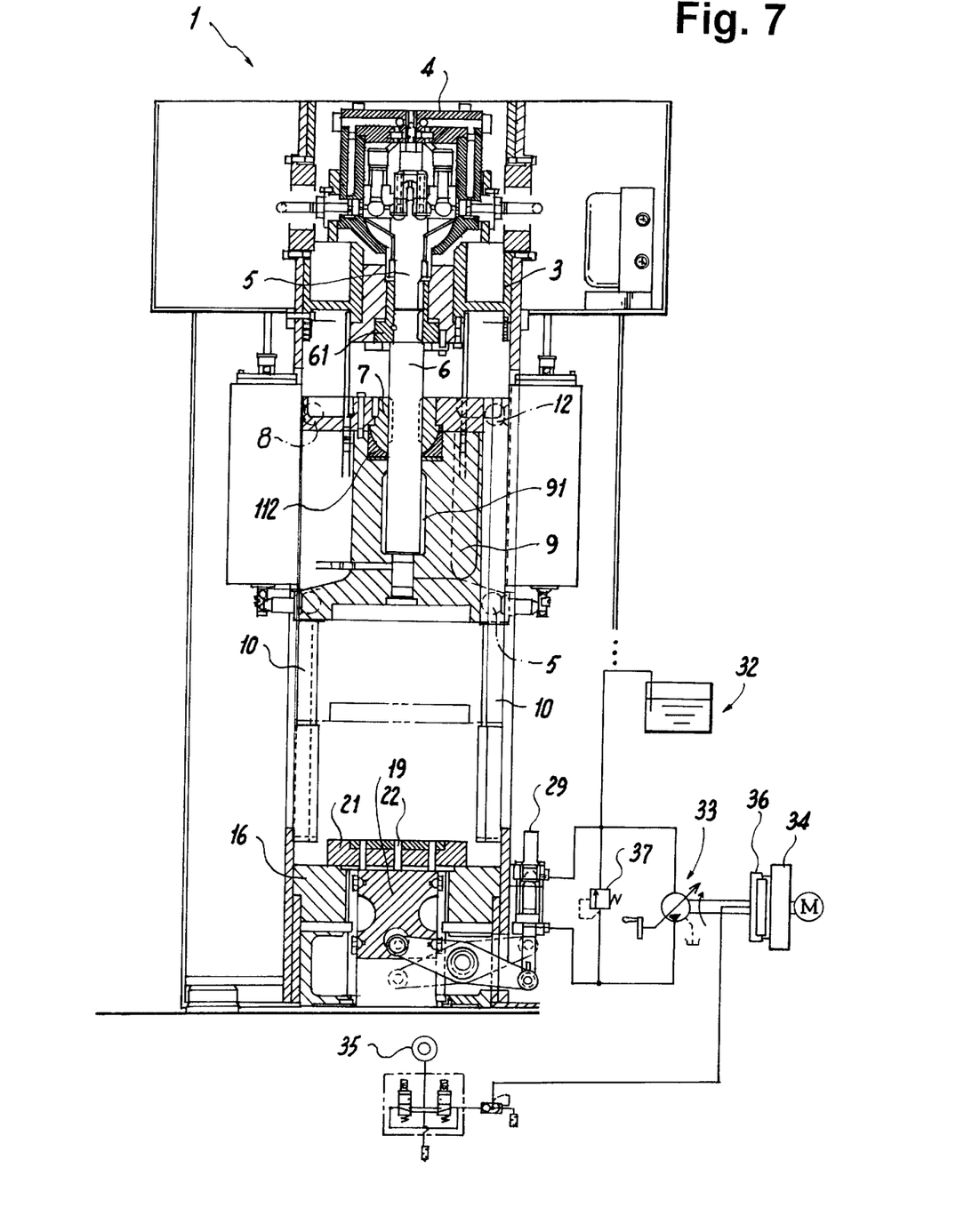
FIG. 7 is a longitudinal front view of a screw type press machine having a knockout device according to an embodiment of the present invention.

At a center part of lower slide 9, hole 91 receives screw shaft 6 with play therebetween. The upper surface of lower slide 9 is opposite and is in spherical contact with spherical nut 7 via a seat 112. Lower slide 9 is hung and affixed to upper slide 8 by a bolt.

Figure 8:
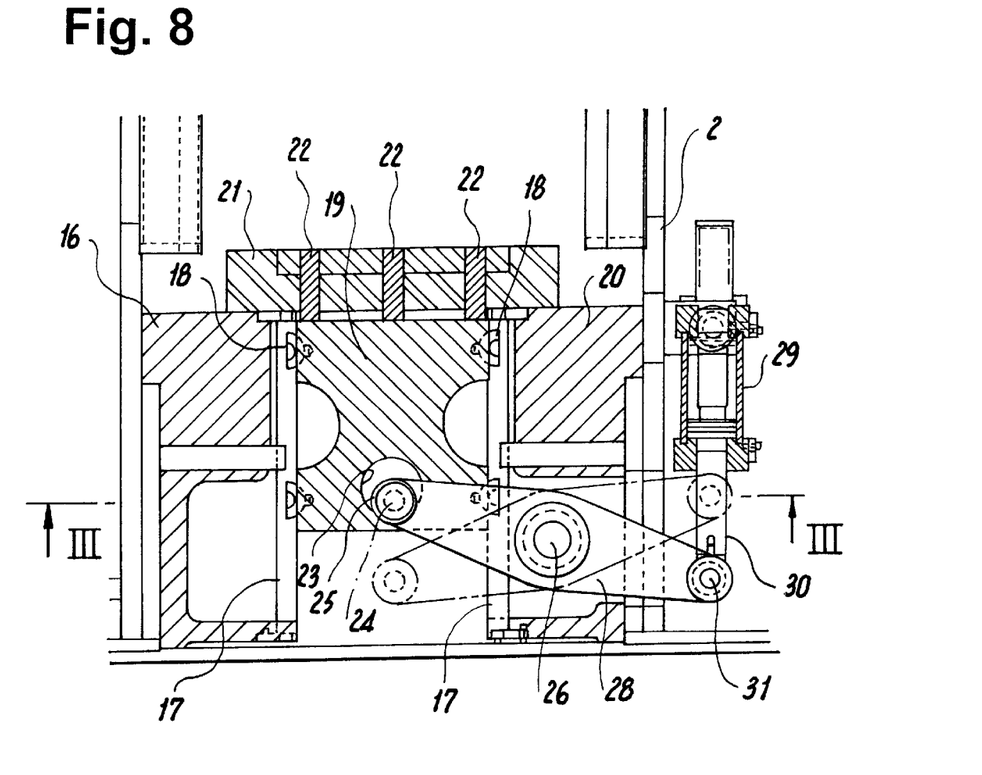
FIG. 8 is a side view of an enlarged longitudinal section of the knockout device of FIG. 7.
Figure 9:
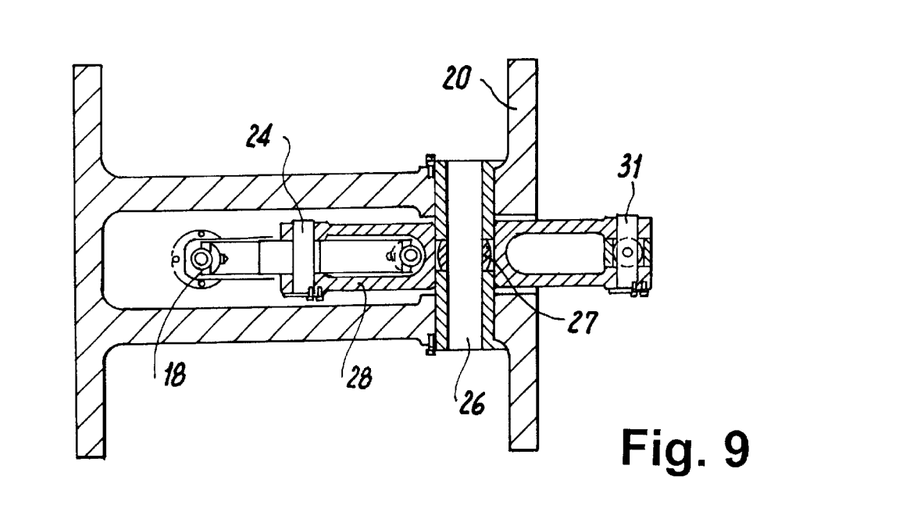
FIG. 9 is a cross-section along line III—III of FIG. 8.
Figure 10:
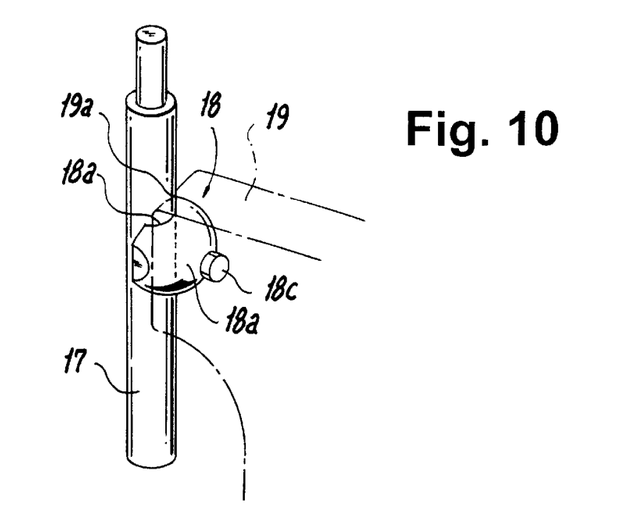
FIG. 10 is an enlarged perspective view of the slide guide of the screw type press machine of FIG. 7.

Referring to FIGS. 8 through 10, a knockout device 16, according to a preferred embodiment of the present invention, is described in detail. A pair of tubular or cylindrical guide rails 17 is planted substantially upright at approximately the center of the press machine. Knockout block 19 is disposed in a freely sliding manner on guide rails 17 via a plurality of middle liners 18, which comprise bearing materials and the like. Knockout block 19 is disposed opposite a knockout pin 22 of a lower holder 21, which is mounted on top of bolster 20. Knockout block 19 has approximately the same plate pressure as guide rail 17. A tubular hole 23 is formed in the lower end center of knockout block 19.

Referring specifically to FIG. 10, as shown in detail, on its outer perimeter, middle liner 18 preferably has a hemispherical surface 18a, which is in surface contact with circular surface 19a of knockout 19. Inner perimeter circular surface 18a of middle liner 18 is in contact with the outer perimeter surface of guide rail 17. Furthermore, middle liner 18 has a protrusion 18c at the outer perimeter summit part of middle liner 18. The construction of middle liner 18 provides for a positional relationship with knockout block 19 in which slipping down is prevented.

A slider 25, having an eccentric shaft 24, is inserted into tubular hole 23. A knockout lever 28 is held at approximately its central part in a freely rotating manner on shaft 26 with spherical bearing 27. Shaft 26 is provided on bolster 20. One end of a two-branched knockout lever 28 is engaged on eccentric shaft 24. The other end of knockout lever 28 is engaged at clevis 31 at one end of piston rod 30 of a double acting double rod hydraulic cylinder 29, which provides the motion source for the knockout lever.

Referring now to FIG. 7, with double acting double rod hydraulic cylinder 29, the oil, which is supplied from a tank 32, is pressurized and controlled by a manual variable hydraulic pump 33. Furthermore, hydraulic pump 33 is driven by energy stored by a motor M through a fly wheel 34. Energy transfer is conducted with a clutch mechanism 36, which is controlled by a driving source 35 of air and the like. Therefore, the present invention has the advantage of supplying hydraulic pressure generating energy in a stable manner with a very small power source. Furthermore, when the hydraulic pressure inside the hydraulic circuit exceeds a set value, there is a pressure control valve 37 for guiding oil to a tank 32, to protect the hydraulic circuit.

With this construction, torque is achieved by pump motor 4. When screw shaft 6 rotates in the direction opposite to the propulsion direction, nut 7, which screws on to screw shaft 6. Upper slide 8, which is restrained from rotation by fixed gibs 10, slide gibs 11, and middle liner 12, descends due to screw action. Lower slide 9, which is joined to upper slide 8, descends in a unitary manner. Because lower slide 9, on which the die is on, and upper slide 8 are separated, the screw torque generated on upper slide 8 does not directly transfer to lower slide 9. The twisting force at the time of product working is greatly reduced.

Next, regarding the knockout device according to an embodiment of the present invention, the oil supplied from tank 32 is compressed by a hydraulic pump 33, driven by the torque of fly wheel 34 in which rotational energy is from motor M is stored. Piston rod 30 of cylinder 29 moves as a result. From this, when piston rod 30 moves downward in the figure, the other end of knockout lever 28 moves upward along the path drawn with shaft 26 as the center. As a result, eccentric shaft 24 also moves with a similar curvature radius.

However this movement is changed to a linear motion in the vertical direction by slider 25. The eccentric load on knockout block 19 is greatly suppressed, and smooth movement is possible. In addition, a plurality of middle liners are disposed between guide rail 17 and knockout block 19. As a result, even if an eccentric load arises in the knockout block, each of the middle liners absorbs the eccentric load (self-alignment), and a smooth motion can be continued.

Referring to FIG. 10, by a combination of spherical surfaces, middle liner 18 is easily positioned between guide rail 17 and knockout block 19. As a result, stable knockout is possible with an extremely simple and small energy source. The effect on resource conservation is great.

Figure 11:
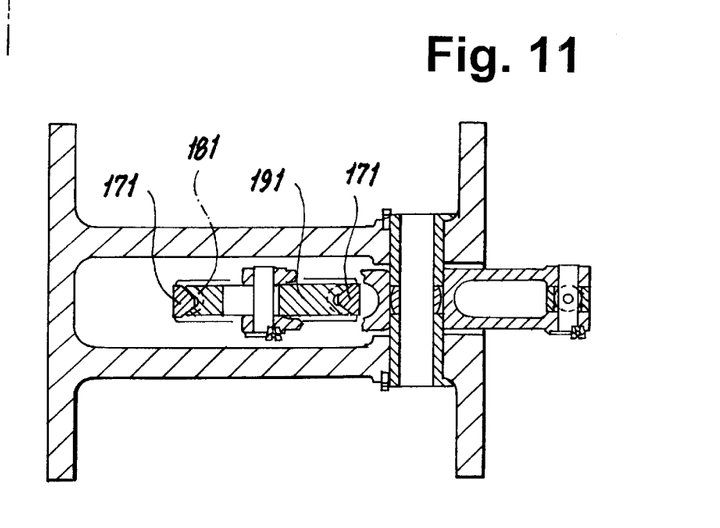
FIG. 11 is a corresponding cross-section drawing along line III—III of FIG. 8 according to an alternate embodiment of the present invention.
Figure 12:
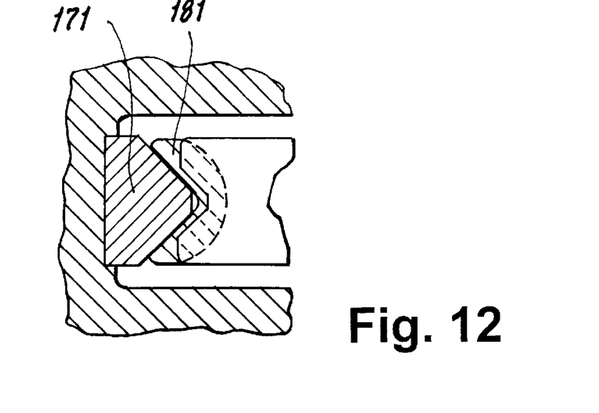
FIG. 12 is an enlarged cross-section of the slide guide of the screw type press machine of FIG. 11

Referring to FIGS. 11 and 12, an alternate embodiment of the present invention is shown. This embodiment is substantially the same as that previously described, however, the guide rail is a triangle pole 171, and the inner surface of middle liner 181 is processed into a triangle. Middle liner 181 slides on triangle pole 171 by a two surface contact. In addition, the outer surface, which is processed into a spherical surface, is in surface contact in a freely pivoting manner with the spherical cavity formed on one side surface of knockout block 191. The details will be omitted, but all of the sliding surfaces are lubricated as needed, and appropriate combinations of materials are selected.

According to the embodiments of the present invention, a knockout device is provided, wherein a plurality of middle liners, which have at least one surface as a spherical surface, is disposed between a side surface of a knockout block and a pair of guide rails. The guide rails are disposed and affixed opposite the block side surface. By guiding the knockout block, even if there is some eccentric load on the knockout block, there is a self-alignment action, and the movement of the block operates smoothly, lightly, and quietly.

A knockout device operates in a stable manner with an extremely simple mechanism by having a tubular or cylindrical guide rail, and by having such a guide rail in surface contact with the other surface of the middle liner.

A knockout device is provided having a guide mechanism with a high mechanical strength by having a triangular pole guide rail, and by having such a guide rail have a two surface contact with the other surface of the middle liner.

A knockout lever has one end linked to a motion source which moves vertically. The lower end of the knockout block is pivotably connected to the other end of the knockout lever through an eccentric pivoting mechanism. As a result, a knockout device is provided in which the pushing up force in the perpendicular direction is always stable and not dependent on the movement pathway of the knockout lever.

The motion source which moves the knockout lever is a double acting double rod type hydraulic cylinder. Oil is supplied from a hydraulic tank, and the cylinder compresses and controls the oil by a variable hydraulic pump, which is driven by a motor. Rotational energy is stored between this hydraulic pump and the motor. In addition, a fly wheel is provided with a clutch which is opened and closed by external control. As a result, an energy conserving knockout device is provided which is simple and small.

After storing the rotational energy of the motor in the fly wheel, the rotational energy is supplied to the hydraulic pump through the clutch, which is opened and closed by external control. As a result, a knockout device is provided which is small and energy conserving.

When the oil pressure inside the hydraulic supply circuit exceeds a predetermined standard value, a pressure control valve operates, and oil is guided to the tank. As a result, a safe knockout device is provided which prevents oil leakage.

By the present invention, a knockout device for a press machine which has low noise and is energy conserving is provided by a simple construction. The energy needed for the knockout is small, and operation is always conducted under a stable knockout load.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A knockout device for a press machine having a slider with a die attachment surface, comprising:

a lower holder opposite said die attachment surface;

a knockout pin passing through said lower holder;

a knockout block which knocks out said knockout pin;

at least first and second guide rails disposed at opposite sides of said knockout block;

means for moving said knockout block along said at least first and second guide rails; and a plurality of middle liners, having at least one spherical surface, between a side surface of said knockout block and said at least first and second guide rails.

2. A knockout device according to claim 1, wherein:

said at least first and second guide rails are substantially cylindrical and in surface contact with a surface of said middle liner.

3. A knockout device according to claim 1, wherein:

said at least first and second guide rails are triangular poles having a two surface contact with two surfaces of said middle liner.

4. A knockout device according to claim 1, further comprising:

an eccentric pivoting mechanism pivotably attached at a first end to a lower end of said knockout block; and a second, opposite end of said eccentric pivoting mechanism attached to a motion source, wherein motion of said motion source provides said means for moving said knockout device.

5. A knockout device according to claim 4, wherein:

said motion source is a double acting double rod type hydraulic cylinder;

said cylinder, through the action of a variable hydraulic pump driven by a motor, compresses and controls oil;

rotational energy is stored between said hydraulic pump and said motor in a fly wheel; and said fly wheel has a clutch which opens and closes by an external control.

6. A knockout device according to claim 5, further comprising:

a pressure control valve which operates and guides oil to a tank when an oil pressure inside a hydraulic supply circuit exceeds a predetermined value.

* * * * *